United States Patent
Lee

[19]

[11] Patent Number: 5,944,628

[45] Date of Patent: Aug. 31, 1999

[54] CONTINUOUSLY VARIABLE TRANSMISSION FOR VEHICLES

[75] Inventor: Yongjoon Lee, Kyunggi-do, Rep. of Korea

[73] Assignee: Hyundai Motor Company, Seoul, Rep. of Korea

[21] Appl. No.: 08/992,571

[22] Filed: Dec. 17, 1997

[30] Foreign Application Priority Data

Dec. 17, 1996 [KR] Rep. of Korea ...................... 96-66459

[51] Int. Cl.⁶ .................................. F16H 37/02
[52] U.S. Cl. .......................... 475/214; 475/210; 475/72
[58] Field of Search ................................. 475/207, 210, 475/211, 212, 214, 215, 216, 217, 219, 72

[56] References Cited

U.S. PATENT DOCUMENTS

| | | | |
|---|---|---|---|
| 4,936,165 | 6/1990 | Doyle et al. ............................ | 475/211 |
| 5,201,691 | 4/1993 | Doyle ..................................... | 475/211 |
| 5,401,221 | 3/1995 | Fellows et al. ......................... | 475/214 |
| 5,720,687 | 2/1998 | Bennett .................................. | 475/214 |

FOREIGN PATENT DOCUMENTS

| | | | |
|---|---|---|---|
| 3703246 | 8/1987 | Germany ............................... | 475/211 |
| JA0049452 | 5/1981 | Japan ..................................... | 475/211 |

*Primary Examiner*—Charles A Marmor
*Assistant Examiner*—Tisha D. Waddell

[57] ABSTRACT

Disclosed is a continuously variable transmission. The continuously variable transmission includes a propulsion controller connected to an engine crankshaft; a forward/reverse controller mounted on an input shaft extending from the propulsion controller and which determines whether the vehicle is driven in forward or reverse modes; a low/high-speed selector connected to an output of the forward/reverse controller, for selecting a low-speed or a high-speed driving state; a continuously variable device connected to a first output of the low/high-speed selector; and a drive power synthesizer connected both an output of the continuously variable device, and to a second output of the low/high-speed selector.

7 Claims, 4 Drawing Sheets

CONTINUOUSLY VARIABLE TRANSMISSION FOR VEHICLES

FIELD OF THE INVENTION

The present invention relates to a continuously variable transmission, and more particularly, to a continuously variable transmission which, while having a simple structure, increases the scope of the shift range to effectively use engine power and improve power transmission efficiency, and which divides a belt load such that durability of the transmission is improved.

BACKGROUND OF THE INVENTION

A transmission for a vehicle acts as a torque and speed changer by providing suitable gear ratio changes that enable the engine to propel the vehicle under various loads. There are three basic types of transmissions for vehicles: a manual transmission in which the driver directly controls the shifting of gears, an automatic transmission which automatically shifts gears according to road load and throttle opening, and a continuously variable transmission in which speeds are continuously shifted over the entire spectrum of speeds without steps therebetween.

The present invention is related to the continuously variable transmission which offers many advantages over the conventional automatic transmission using including decreased fuel consumption and overall weight, and improved power transmission performance.

Continuously variable transmissions generally use two pulleys mounted respectively on input and output shafts. A diameter of each pulley is variable, and the pulleys are connected to each other by a steel belt or chain. Shift ranges of the transmission are continuously varied through the changes in diameter of the pulleys.

However, continuously variable transmissions using only a belt connecting diameter-variable pulleys have a drawback in that they are limited in the scope of shift ranges available. As a result, engine power is not effectively utilized.

Further, because all rotational power is transmitted through a single belt, the belt can become quickly worn, reducing the life span of the belt.

SUMMARY OF THE INVENTION

The present invention has been made in an effort to solve the above problems.

It is an object of the present invention to provide a continuously variable transmission which is simple in structure and effectively uses engine power by increasing the scope of the shift range.

To achieve the above object, the present invention provides a continuously variable transmission including a propulsion controller connected to an engine crankshaft; a forward/reverse controller mounted on an input shaft extending from the propulsion controller and which determines whether the vehicle is driven in forward or reverse modes; a low/high-speed selector connected to an output of the forward/reverse controller, for selecting a low-speed or a high-speed driving state; a continuously variable device connected to a first output of the low/high-speed selector; and a drive power synthesizer connected both an output of the continuously variable device, and to a second output of the low/high-speed selector.

The continuously variable device further includes a drive pulley connected to the first power shaft on an end opposite that connected to the forward/reverse controller, a driven pulley separated at a predetermined distance from the drive pulley, and a belt connecting the drive pulley and the driven pulley.

The forward/reverse controller is realized through a double pinion planetary gearset having a sun gear directly connected to the input shaft; a ring gear variably connected to the input shaft through a first friction member to selectively act as an input element, and variably connected to a transmission housing through a second friction element to selectively act as a reacting element; and a planet carrier having first and second pinion gears which are meshed with the sun gear and ring gear, the planet carrier being connected to the output of the forward/reverse controller such that the planet carrier acts as an output element.

It is preferable that the first friction member is a multi-plate clutch, and the second friction member is a brake band.

The low/high-speed selector is realized through a synchronizer for manual transmissions and includes a clutch hub integrally formed on a first power shaft; a sleeve circumscribing and splined to the clutch hub such that the sleeve can slide fore and aft on the clutch hub; low and high-speed clutch gears provided on opposite sides of the clutch hub and which are selectively meshed with the sleeve according to the movement of the same along the clutch hub; and low and high-speed input gears selectively engaged by the meshing of the sleeve with the low and high-speed clutch gears, the low and high-speed input gears being provided such that no interference is given to the rotation of the first power shaft, and connected respectively to low and high-speed gears of the drive power synthesizer through first and second idling gears.

The low and high-speed input gears of the low/high-speed selector are selectively connected to the first power shaft through clutches, and to low and high-speed gears of the drive power synthesizer through chains.

The drive power synthesizer is realized through a single pinion planetary gearset having a ring gear fixedly connected to the second power shaft; a planet carrier extended having the low and high-speed gears; and a sun gear integrally connected to a third power shaft which passes through the planet carrier, the sun gear acting as an output element.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

Preferred embodiments of the present invention will now be described in detail with reference to the accompanying drawings.

Figure 1:
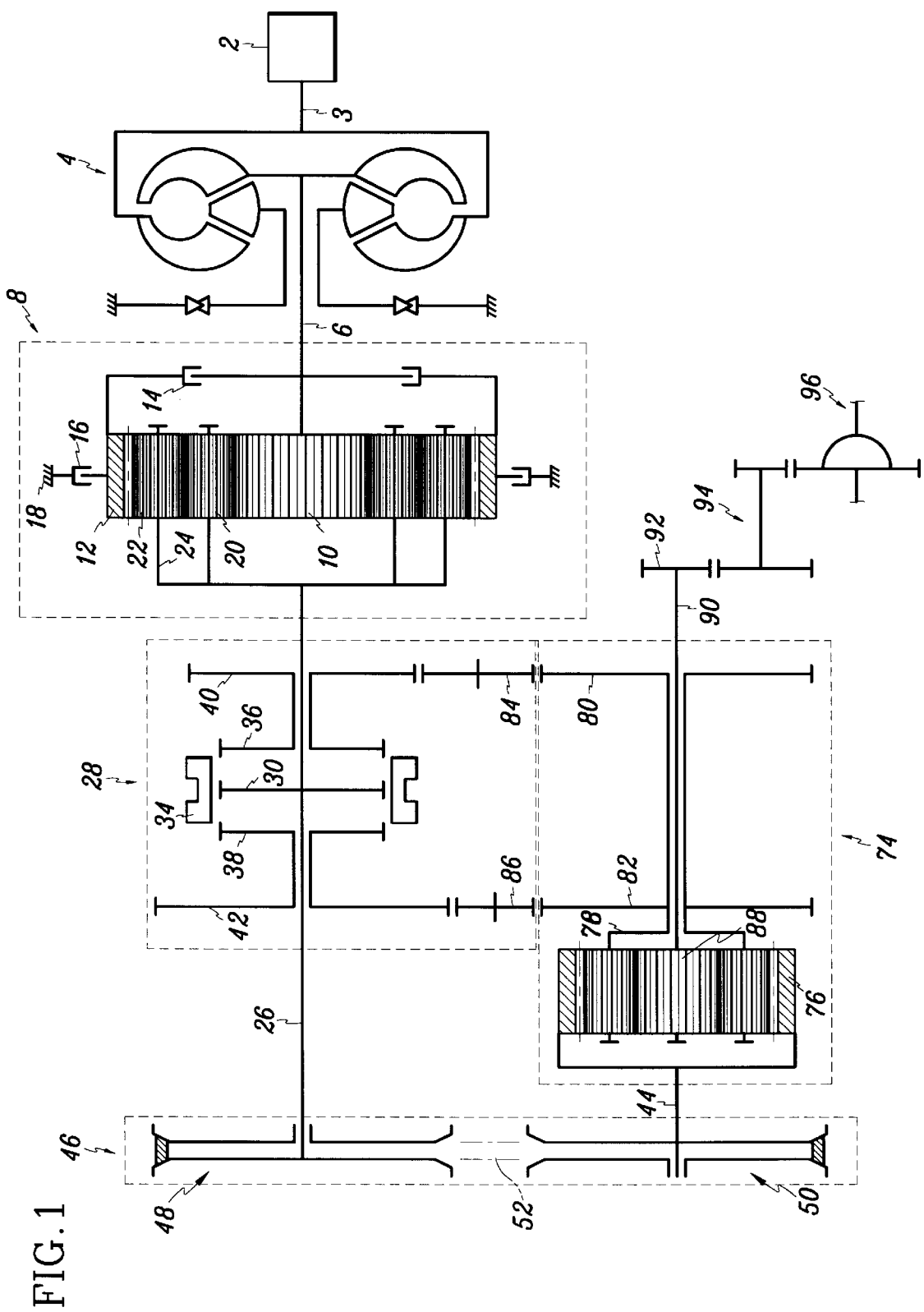
FIG. 1 is a schematic diagram of a continuously variable transmission according to a first preferred embodiment of the present invention.

Referring first to FIG. 1, shown is a schematic diagram of a continuously variable transmission according to a first preferred embodiment of the present invention. In the drawing, rotational force generated from an engine 2 is transmitted through an engine crankshaft 3 to a propulsion controller 4.

A torque converter or torsional damper are generally used as the propel controller 4 above. In either case, the propulsion controller 4 acts to transmit and cut off rotational power of the engine 2, and absorb torsional vibration. A torque converter is used in the present invention.

A forward/reverse controller 8 is mounted to an input shaft 6, the input shaft 6 extending from the propulsion controller 4. A double pinion planetary gearset is used in the present invention for the forward/reverse controller 8.

The forward/reverse controller 8 comprises a sun gear 10 directly connected to the input shaft 6; a ring gear 12 variably connected to the input shaft 6 through a first friction member 14 to selectively act as an input element, and variably connected to a transmission housing 18 through a second friction element 16 to selectively act as a reacting element; and a planet carrier 24 having first and second pinion gears 20 and 22 which are meshed with the sun gear 10 and ring gear 12. The planet carrier 24 is connected to a first power shaft 26 such that the planet carrier 24 acts as an output element.

In the above, a conventional multi-plate clutch can be used as the first friction member 14 and a conventional brake band can be used as the second friction member 16.

A low/high-speed selector 28 is disposed on the first power shaft 26. The low/high-speed selector 28 is a conventional synchronizer used in manual transmissions. The low/high-speed selector 28 comprises a clutch hub 30 integrally formed on the first power shaft 26, a sleeve 34 circumscribing and splined to the clutch hub 30 such that the sleeve 34 can slide fore and aft on the clutch hub 30, and low and high-speed clutch gears 36 and 38 provided on opposite sides of the clutch hub 30. The last and high speed clutch gears 36 and 38 are selectively meshed with the sleeve 34 according to the movement of the same along the clutch hub 30, and low and high-speed input gears 40 and 42 are selectively engaged by the meshing of the sleeve 34 with the low and high-speed clutch gears 36 and 38. The low and high-speed input gears 40 and 42 are provided such that no interference is given to the rotation of the first power shaft 26.

A continuously variable device 46 is connected to an end of the first power shaft 26 opposite that connected to the planet carrier 24 of the forward/reverse controller 8, and to an end of a second power shaft 44. The second power shaft 44 is provided at a predetermined distance from the first power shaft 26. Namely, a drive pulley 48 of the continuously variable device 46 is connected to the first power shaft 26, and a driven pulley 50 of the continuously variable device 46 is connected to the second power shaft 44, the drive and driven pulleys 48 and 50 being connected by a belt 52.

Diameters of the drive and driven pulleys 48 and 50 are varied by hydraulic pressure generated by the engine 2 to change shift ranges. This will be described in more detail hereinbelow with reference to FIG. 4.

Figure 4:
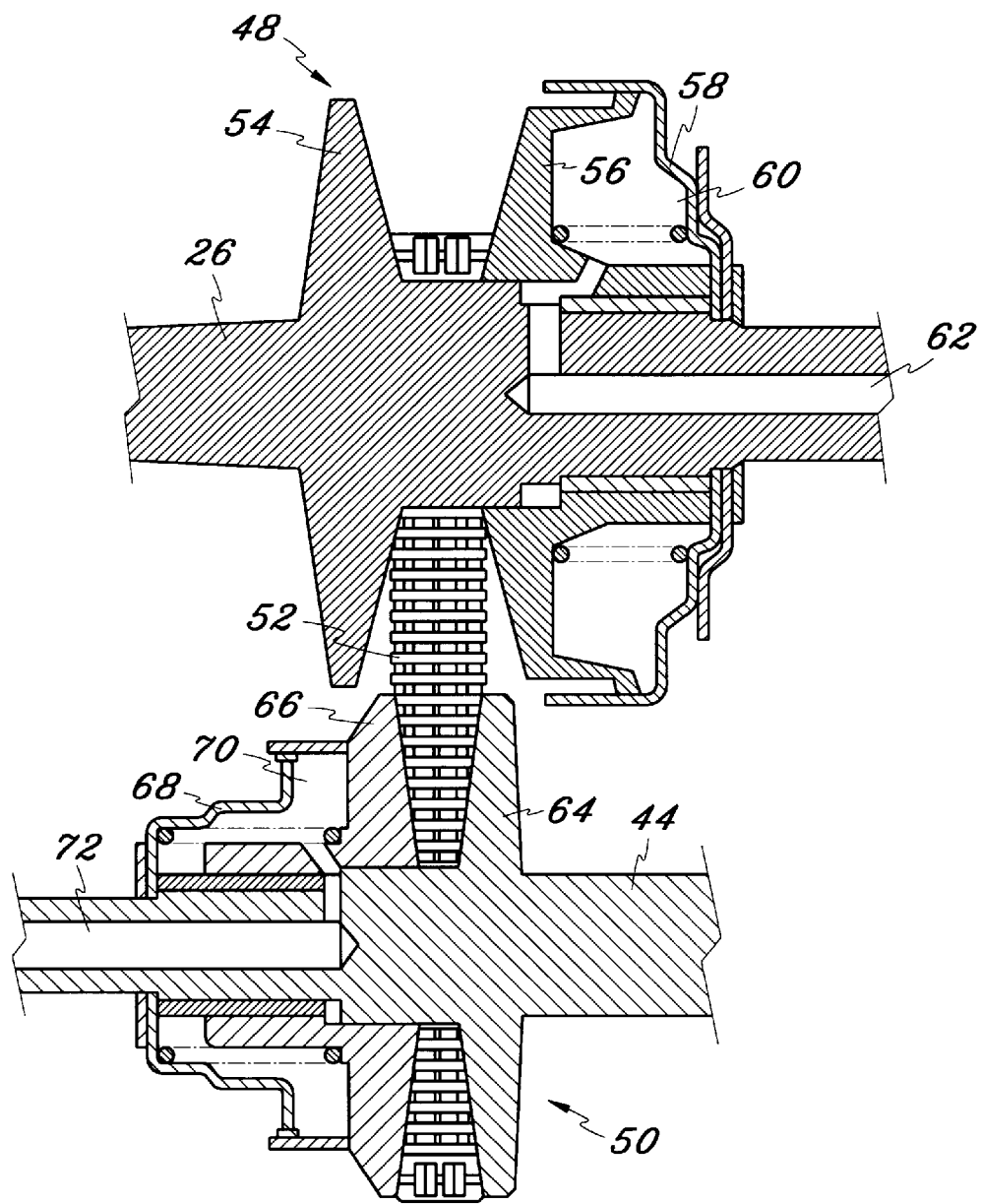
FIG. 4 is a schematic diagram of a continuously variable transmission according to a second preferred embodiment of the present invention.

As shown in FIG. 4, the drive pulley 48 includes a fixed member 54 and a moveable member 56. The fixed member 54 is integrally formed with the first power shaft 26, while the moveable member 56 is able to move right and left (in the drawing) on the first power shaft 26.

A casing 58 is provided adjacent to the moveable member 56, and a hydraulic pressure chamber 60 is defined by the casing 58 and moveable member 56. The hydraulic pressure chamber 60 receives hydraulic pressure, generated by the engine 2 (FIG. 1), through a line 62 formed in the first power shaft 26.

The driven pulley 50 also includes a fixed member 64 and a moveable member 66. The fixed member 64 is integrally formed with the second power shaft 44, while the moveable member 66 is able to move right and left (in the drawing) on the second power shaft 44.

A casing 68 is provided adjacent to the moveable member 66, and a hydraulic pressure chamber 70 is defined by the casing 68 and moveable member 66. The hydraulic pressure chamber 70 receives hydraulic pressure, generated by the engine 2 (FIG. 1), through a line 72 formed in the second power shaft 44.

Referring back to FIG. 1, a drive power synthesizer 74 is connected to an end of the second power shaft 44 opposite that connected to the driven pulley 50 of the continuously variable device 46, and to an output side of the low/high-speed selector 28. The drive power synthesizer 74 is realized through a single pinion planetary gearset.

The drive power synthesizer 74 includes a ring gear 76 fixedly connected to the second power shaft 44, a planet carrier 78 connected to a low-speed gear 80 and a high-speed gear 82, and a sun gear 88 integrally connected to a third power shaft 90 which passes through the planet carrier 78.

A first idling gear 84 is provided between the low-speed input gear 40 of the low/high-speed selector 28 and the low-speed gear 80 of the drive power synthesizer 74, and a second idling gear 86 is provided between the high-speed input gear 42 of the low/high-speed selector 28 and the high-speed gear 82 of the drive power synthesizer 74. Also, an output gear 92 is mounted on a distal end of the third power shaft 90, the output gear 92 being connected to a transfer gear shaft 94, which, in turn, is connected to a differential 96. In this way, drive power is transmitted to drive wheels (not shown) via a drive shaft (not shown) to propel the vehicle.

The scope of gearless shifting is expanded in the drive power synthesizer 74. That is, the drive power synthesizer 74 increases the rotational power input from the continuously variable device 46 according to the number of revolutions input from the low/high-speed selector 28.

Describing in more detail, in the continuously variable transmission structured as in the above, when the driver positions a shift select lever (not shown) in a drive D range, the first friction member 14 is engaged. Accordingly, power from the input shaft 6 is input through the sun gear 10 and ring gear 12 of the forward/reverse controller 8, and forward rotating power is output to the first power shaft 26 through the planet carrier 24 of the forward/reverse controller 8.

When power is output from the forward/reverse controller 8, part of the rotational force is input to the planet carrier 78 of the drive power synthesizer 74 through the low/high-speed selector 28. At the same time, gearless shifting is realized by the changes in diameter of the drive and driven pulleys 48 and 50 of the continuously variable device 46, and input is realized through the ring gear 76 of the drive power synthesizer 74.

As explained above, the low/high-speed selector 28 operates such that input is realized through the low-speed input gear 40 and the low-speed gear 80 in low speeds, and through the high-speed input gear 42 and the high-speed gear 82 in high speeds.

Gearless shifting is realized by changes in diameter of the drive and driven pulleys 48 and 50 of the continuously variable device 46. Namely, different shift modes are realized according to the relation in the diameters of the drive and driven pulleys 48 and 50 such that when the diameter of the drive pulley 48 is identical to that of the driven pulley 50, a 1:1 shift ratio is achieved; when the diameter of the drive pulley 48 is larger than that of the driven pulley 50, increased speed is realized; and when the diameter of the drive pulley 48 is smaller than that of the driven pulley 50, a reduction in speed is realized.

Through this operation, gradual and gearless shifting is realized between the differences in diameters of the drive and driven pulleys 48 and 50 over the whole range from a starting speed to high speeds. The different shift ranges realized in the continuously variable device 46 are input to the drive power synthesizer 74 through the second power shaft 44.

As described above, the scope of gearless shifting is expanded in the drive power synthesizer 74 by increasing the rotational power input from the continuously variable device 46 according to the number of revolutions input from the low/high-speed selector 28. Namely, in a state where the ring gear 76 of the drive power synthesizer 74 receives input from the continuously variable device 46, if the planet carrier 78 of the drive power synthesizer 74 also receives input from the low/high-speed selector 28, the rotational speed of the sun gear 88, acting as the output element, can be greatly varied.

Figure 3:
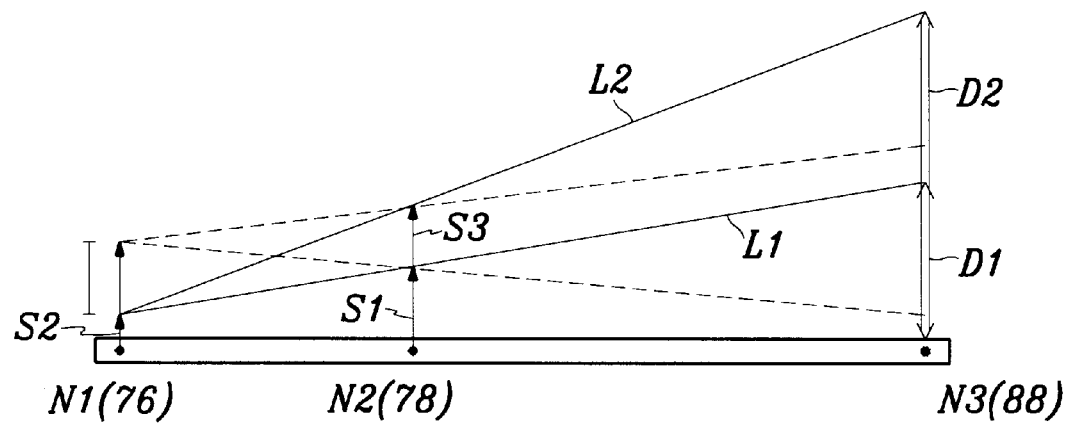
FIG. 3 is a lever analogy used to describe the operation of a continuously variable transmission according to a preferred embodiment of the present invention.

Describing in more detail with reference to the lever analogy of FIG. 3, used for explaining the operation of the single planetary gearset of the drive power synthesizer, a first node N1 indicates the ring gear 76, a second node N2 indicates a planet carrier 78, and a third node N3 indicates the sun gear 88. The establishment of the nodes is done using the conventional lever analogy method. Accordingly, a detailed explanation thereof will be omitted.

When a low speed is selected, rotational power transmitted through the planet carrier 78 is input as shown by a first input line Si of the second node N2, and in this state, rotational power is also input to the continuously variable device 46. The rotational power input to the ring gear 76 of the drive power synthesizer 74 from the continuously variable device 46 becomes a second input line S2. A line connecting the input lines S1 and S2 to the third node N3 becomes a first output line D1.

From the above state, when a high speed state is selected, input is realized through the second node N2 as shown by a third input line S3. Accordingly, a line connecting the second and third input lines S2 and S3 to the third node N3 becomes a second output line D2.

As illustrated in FIG. 3, therefore, even if input speed from the continuously variable device 46 remains the same, output speed can be greatly varied by the selective operation of the low/high-speed selector 28.

Further, if rotational speed input to the continuously variable device 46 is increased, output speed is reduced as shown by the dotted lines of FIG. 3. Accordingly, a desired shift range can easily be attained by suitably controlling rotational force input to the drive power synthesizer 74 from the continuously variable device 46 and the low/high-speed selector 28.

Figure 2:
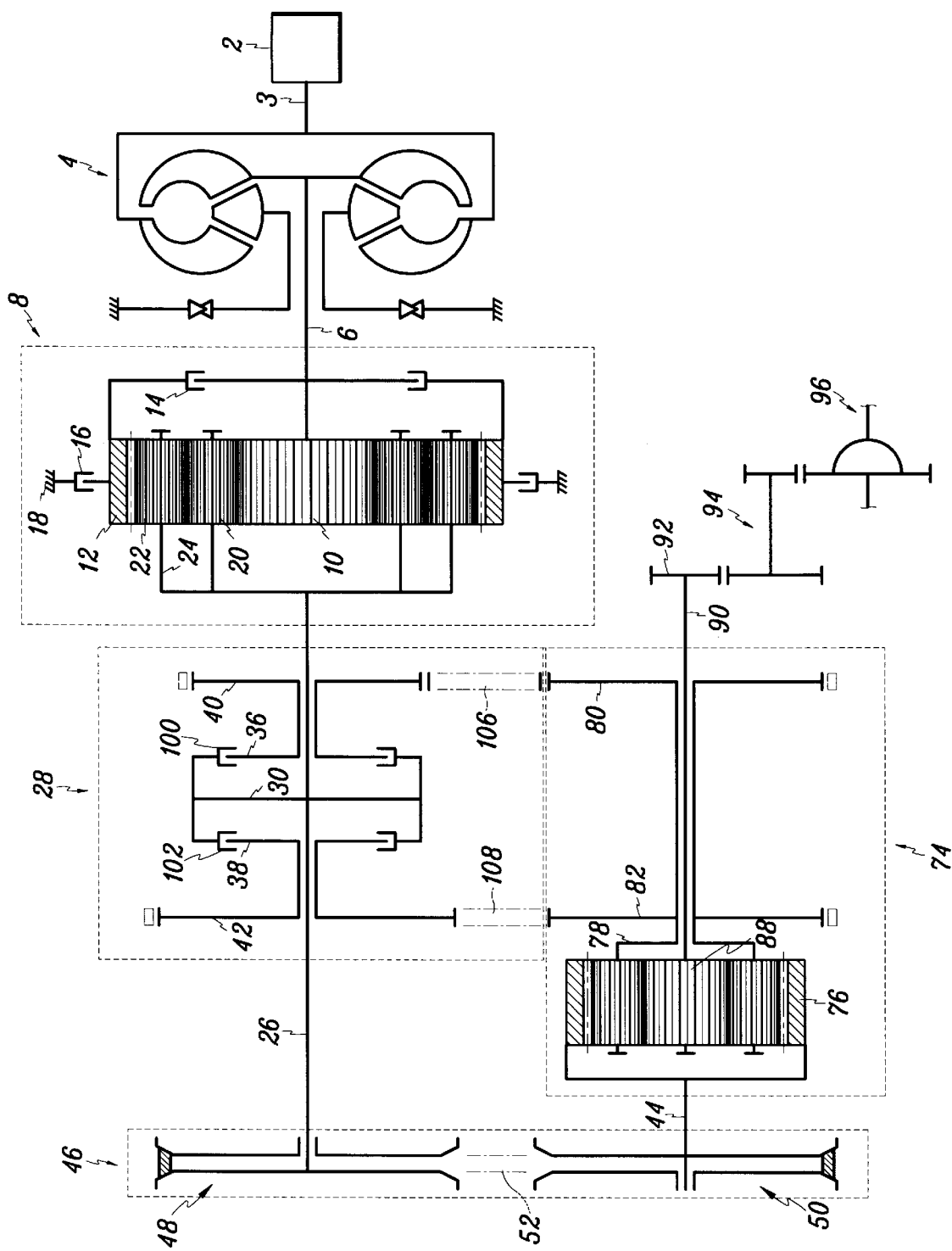
FIG. 2 is a sectional view of a continuously variable transmission according to a preferred embodiment of the present invention.

Referring now to FIG. 2, shown is a schematic diagram of a continuously variable transmission according to a second preferred embodiment of the present invention.

In the second embodiment, the selection of the low/high-speed clutch gears 36 and 38 is realized through clutches and not through a clutch hub and a sleeve as in the first embodiment. Namely, the low-speed and high-speed input gears 40 and 42 are variably connected to the first power shaft 26 through low-speed and high-speed clutches 100 and 102, respectively.

Also in the second embodiment, the low-speed and high-speed input gears 40 and 42 are connected to the low-speed and high-speed gears 80 and 82 through first and second chains 106 and 108, respectively.

In the continuously variable transmission of the present invention, engine power is effectively used by enlarging the scope of gearless shifting, while maintaining a simple structure. Further, by dividing the load applied to the belt of the continuously variable device, i.e., to the low/high-speed controller, the durability of the system is improved.

While this invention has been described in connection with what is presently considered to be the most practical and preferred embodiment, it is to be understood that the invention is not limited to the disclosed embodiments, but, on the contrary, it intended to cover various modifications and equivalent arrangements included within the spirit and scope of the appended claims.

What is claimed is:

1. A continuously variable transmission, comprising:
    a propulsion controller connected to an engine crankshaft;
    a forward/reverse controller mounted on an input shaft extending from the propulsion controller and which determines whether the vehicle is driven in forward or reverse modes;
    a low/high-speed selector connected to an output of the forward/reverse controller, for selecting a low-speed or a high-speed driving state;
    a continuously variable device connected to said output of the forward/reverse controller, said continuously variable device including means for changing a diameter of said continuously variable device, said continuously variable device being driven during all speeds of said transmission; and
    a drive power synthesizer connected both to an output of the continuously variable device, and to a second output of the low-high-speed selector.

2. The continuously variable transmission of claim 1, wherein the continuously variable device comprises:
    a variable diameter drive pulley connected to a first power shaft on an end opposite that connected to the forward/reverse controller;
    a variable diameter driven pulley separated at a predetermined distance from the drive pulley; and
    a belt connecting the drive pulley and the driven pulley, said means for changing a diameter of said continuous variable device including hydraulic lines connected to each variable diameter pulley.

3. The continuously variable transmission of claim 1, wherein the forward/reverse controller comprises a double pinion planetary gearset having:

a sun gear directly connected to the input shaft;

a ring gear variably connected to the input shaft through a first friction member to selectively act as an input element, and variably connected to a transmission housing through a second friction element to selectively act as a reacting element; and a planet carrier having first and second pinion gears which are meshed with the sun gear and ring gear, the planet carrier being connected to the output of the forward/reverse controller such that the planet carrier acts as an output element.

4. The continuously variable transmission of claim 3, wherein the first friction member is a multi-plate clutch, and the second friction member is a brake band.

5. The continuously variable transmission of claim 1, wherein the low/high-speed selector comprises a synchronizer for manual transmissions comprising:

a clutch hub integrally formed on a first power shaft;

a sleeve circumscribing and splined to the clutch hub such that the sleeve can slide fore and aft on the clutch hub;

low and high-speed clutch gears provided on opposite sides of the clutch hub and which are selectively meshed with the sleeve according to the movement of the same along the clutch hub; and low and high-speed input gears selectively engaged by the meshing of the sleeve with the low and high-speed clutch gears, the low and high-speed input gears being provided such that no interference is given to the rotation of the first power shaft, and connected respectively to low and high-speed gears of the drive power synthesizer through first and second idling gears.

6. The continuously variable transmission of claim 5, wherein the low and high-speed input gears of the low/high-speed selector are selectively connected to the first power shaft through clutches, and to low and high-speed gears of the drive power synthesizer through chains.

7. The continuously variable transmission of claim 1, wherein the drive power synthesizer comprises a single pinion planetary gearset having:

a ring gear fixedly connected to the second power shaft;

a planet carrier extended having the low and high-speed gears; and a sun gear integrally connected to a third power shaft which passes through the planet carrier, the sun gear acting as an output element.

* * * * *